(12) United States Patent
Eto et al.

(10) Patent No.: US 12,428,146 B2
(45) Date of Patent: Sep. 30, 2025

(54) CONTROL SYSTEM AND CONTROL METHOD, AND AIRCRAFT

(71) Applicant: HONDA MOTOR CO., LTD., Tokyo (JP)

(72) Inventors: Masashi Eto, Saitama (JP); Yuya Ishihara, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 178 days.

(21) Appl. No.: 18/190,148

(22) Filed: Mar. 27, 2023

(65) Prior Publication Data
US 2023/0312119 A1 Oct. 5, 2023

(30) Foreign Application Priority Data

Mar. 30, 2022 (JP) .................................. 2022-057479

(51) Int. Cl.
| | |
|---|---|
| *B64D 31/00* | (2024.01) |
| *B60L 50/60* | (2019.01) |
| *B60L 58/10* | (2019.01) |
| *B64C 29/00* | (2006.01) |

(52) U.S. Cl.
CPC .............. *B64D 31/00* (2013.01); *B60L 50/60* (2019.02); *B60L 58/10* (2019.02); *B60L 2200/10* (2013.01); *B64C 29/0008* (2013.01)

(58) Field of Classification Search
CPC ............. B60L 2200/10; B60L 2220/42; B60L 2260/44; B60L 2260/52; B60L 2260/54; B60L 3/0092; B60L 50/10; B60L 50/60; B60L 58/10
See application file for complete search history.

(56) References Cited

U.S. PATENT DOCUMENTS

| | | | |
|---|---|---|---|
| 9,643,729 B2* | 5/2017 | Walter-Robinson | ......................... B64D 27/357 |
| 11,609,159 B2* | 3/2023 | Orol | ...................... B64U 80/70 |
| 11,993,409 B2* | 5/2024 | Howe | ................... B64U 70/97 |
| 2006/0048988 A1 | 3/2006 | Dreibholz | |

(Continued)

FOREIGN PATENT DOCUMENTS

| | | |
|---|---|---|
| JP | 2006076567 A | 3/2006 |
| JP | 2019038327 A | 3/2019 |

(Continued)

OTHER PUBLICATIONS

Office Action issued for counterpart Japanese Application No. 2022-057479, transmitted from the Japanese Patent Office on Aug. 19, 2025.

*Primary Examiner* — Tyler J Lee

(57) ABSTRACT

A control system 70 includes: a VTOL rotor 20 and a cruise rotor 29 configured to generate a thrust; a power unit that has a power generation device 40a configured to generate power and supply the power to the rotors, and a battery 32 configured to store power which is supplied from the power generation device, and supply stored power to the rotors; and a control unit 91 configured to calculate a charging time of the battery based on a required amount of power storage that should be stored in the battery when the aircraft flies in a predetermined flight condition, and a state of the battery, and determine a charge start time of the battery based on the charging time and a flight time it takes to reach the predetermined flight condition. With this, it is possible to suppress a deterioration.

20 Claims, 6 Drawing Sheets

(56) References Cited

U.S. PATENT DOCUMENTS

| | | | |
|---|---|---|---|
| 2015/0258909 A1* | 9/2015 | Kim | B60H 1/00392 |
| | | | 320/155 |
| 2017/0057650 A1* | 3/2017 | Walter-Robinson | H02P 4/00 |
| 2020/0185928 A1* | 6/2020 | Ha | B60L 58/27 |
| 2022/0205420 A1* | 6/2022 | Kumar | H02J 7/1423 |
| 2022/0306320 A1* | 9/2022 | Howe | B60L 53/16 |
| 2023/0089535 A1* | 3/2023 | Lee | H01M 10/625 |
| | | | 429/120 |
| 2023/0170724 A1* | 6/2023 | Narchail | H01M 10/486 |
| | | | 320/153 |
| 2024/0170993 A1* | 5/2024 | Tanemura | H01M 10/0525 |
| 2024/0396357 A1* | 11/2024 | Osada | H01M 10/44 |

FOREIGN PATENT DOCUMENTS

| | | |
|---|---|---|
| JP | 2019077361 A | 5/2019 |
| JP | 2020117024 A | 8/2020 |

* cited by examiner

CONTROL SYSTEM AND CONTROL METHOD, AND AIRCRAFT

CROSS-REFERENCE TO RELATED APPLICATIONS

The contents of the following Japanese patent application(s) are incorporated herein by reference:
NO. 2022-057479 filed in JP on Mar. 30, 2022

BACKGROUND

1. Technical Field

The present invention relates to a control system and a control method, and an aircraft.

2. Related Art

In the related art, a vertical take-off and landing aircraft (referred to as a VTOL aircraft or simply an aircraft) is known for taking off and landing by ascending and descending in a vertical direction by a plurality of take-off and landing (VTOL) rotors that are arranged on a right and a left of a fuselage, and flying in a horizontal direction by a cruise rotor that is arranged at a rear of the fuselage. Such an aircraft uses power which is generated by using a power generation device including a gas turbine engine, or power with which a battery is charged, to operate a plurality of rotors. Here, in an aircraft disclosed in Patent Document 1, a gas turbine engine is driven at high output power to enhance a fuel consumption efficiency, and further, the gas turbine engine is switched between an operation state and a stop state based on an amount of power stored in a battery during flight, and then a rotor is operated by a power generation by a power generation device during the operation state and the battery is charged to a full charge, and the battery is discharged during the stop state to operate the rotor only by the discharged power. However, there is a problem that a deterioration of the battery easily progresses when a state of charge (SOC) is great.

Patent Document 1: Japanese Patent Application Publication No. 2019-77361

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential for a solving means of the invention.

Figure 1:
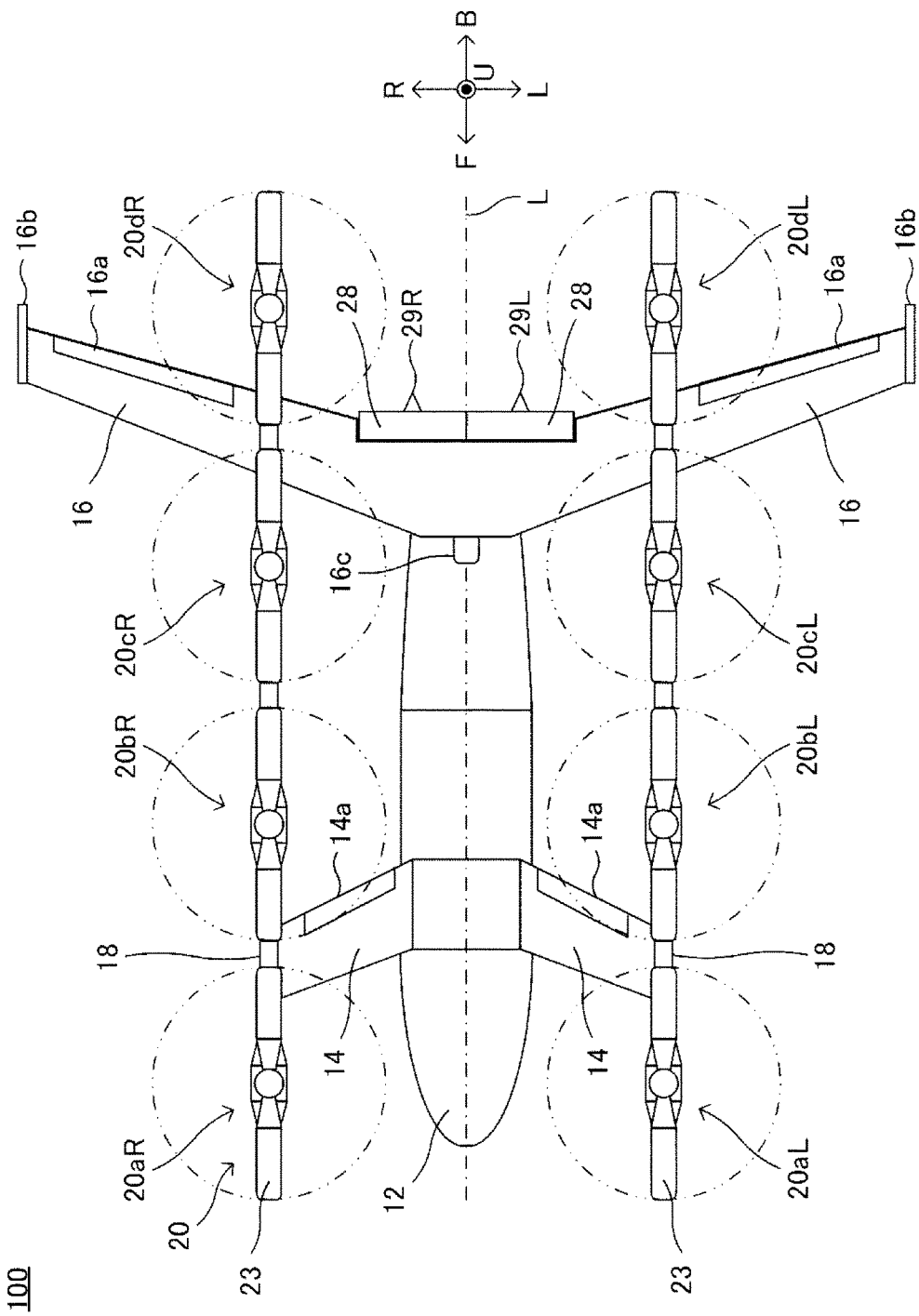
FIG. 1 shows a configuration of an aircraft according to the present embodiment in a top view.

FIG. 1 shows a configuration of an aircraft 100 according to the present embodiment in a top view. The aircraft 100 is a vertical take-off and landing aircraft that includes a plurality of rotors having electric motors as drive sources, and uses a take-off and landing rotor (also referred to as a VTOL rotor) 20 to generate a thrust to take off and land in a vertical direction, and uses a rotor for a cruise (also referred to as a cruise rotor) 29 to generate a thrust to fly in a horizontal direction; and is also a hybrid aircraft that can use power which is generated by a power generation device 40a (an engine 44 and a motor generator 42), and power with which a battery 32 is charged, to operate an electric motor and charge the battery 32 by the power generation device 40a.

The aircraft 100 according to the present embodiment is configured to control a power unit that charges the battery 32 by the power generation device 40a, and includes a fuselage 12, a front wing 14, a rear wing 16, two booms 18, eight VTOL rotors 20, two cruise rotors 29, a high voltage system 40, a communication system 49, and a control system 70.

The fuselage 12 is a structure that provides a space for boarding a crew and a passenger, and for loading cargo or the like, and stores devices such as the battery 32, the motor generator 42, the engine 44, and the like. The fuselage 12 has a shape that is bilaterally symmetrical with respect to a central axis L, extends in a front-back direction parallel to the central axis L, and is narrow in a right-left direction orthogonal to the central axis L in a horizontal plane. Here, the direction parallel to the central axis L is defined as the front-back direction in which a left side of a drawing and a right side of the drawing are respectively a front (F) and a back (B); and the direction orthogonal to the central axis L in the horizontal plane is defined as a width direction (or the right-left direction) in which an upper side of the drawing and a lower side of the drawing are respectively a right side (R) and a left side (L). In addition, the vertical direction is orthogonal to each of these front-back direction and the width direction, and sides of an upward orientation and a downward orientation in the vertical direction are also respectively referred to as an upper side (U) and a lower side (L). The fuselage 12 has a front end with a round curvature in the top view, and a rear end that is tapered to be narrow in parallel to the width direction to some extent, for a body portion.

The front wing 14 is a wing body which is provided to extend laterally from the fuselage 12 to generate lift during a cruise, that is, by moving forward, and functions as a canard of the aircraft 100. The front wing 14 has a V shape in which two wing bodies respectively extend from a center portion to a right-front direction and a left-front direction, and is fixed, at a center portion, on an upper portion of a front side of the body portion of the fuselage 12 with an opening of the V shape facing forward. The front wing 14 includes an elevator 14a that is arranged on each of rear edges of the two wing bodies.

The rear wing 16 is a wing body which is provided to extend laterally from the fuselage 12 to generate lift during the cruise, that is, by moving forward, and functions as a swept-back wing which reduces air resistance. The rear wing 16 has a V shape in which two wing bodies respectively extend from a center portion to a right-back direction and a left-back direction, and is fixed, at a center portion, on an upper portion of the rear end of the fuselage 12, via a pylon 16c, with an opening of the V shape facing backward. The rear wing 16 includes an elevon 16a that is arranged on each of rear edges of the two wing bodies, and a vertical tail fin 16*b* that is arranged at a wing end.

Here, a wing area of the rear wing 16 is greater than that of the front wing 14, and a wing width of the rear wing 16 is wider than that of the front wing. In this manner, the lift generated by the rear wing 16 by moving forward is greater than the lift generated by the front wing 14, and the rear wing 16 functions as a main wing of the aircraft 100. It should be noted that the wing areas, lengths or the like of the front wing 14 and the rear wing 16 may be determined based on a balance of the lift which is generated by each wing, a position of the center of gravity, an attitude of an airframe during the cruise, and the like.

The two booms 18 are structures that are respectively separated from the fuselage 12 to the left and the right to be supported by the front wing 14 and the rear wing 16, and accomplish functions to support or store each of constituting units of the VTOL rotor 20. The two booms 18 each have a tubular shape extending in the front-back direction in the top view and a wing type shape of a cross section in which an upper side has a round curvature and a lower side is tapered in a front view, and are paired to be arranged to be bilaterally symmetrical with respect to the fuselage 12 (that is, the central axis L). It should be noted that the two booms 18 may be formed to extend in the front-back direction and have an arch shape curvature in the width direction. The two booms 18 each have front side end portions positioned in front of the front wings 14 to be supported by edges of the front wings 14 on a front side of the body portion (between two VTOL rotors 20*a*L, 20*b*L on the front side, and between two VTOL rotors 20*a*R, 20*b*R on the front side); and each have rear side end portions positioned behind the rear wings 16 to be supported by the rear wings 16 on a rear side of the body portion (between two rear VTOL rotors 20*c*L, 20*d*L on the rear side, and between two VTOL rotors 20*c*R, 20*d*R on the rear side).

The eight VTOL rotors 20 (20*a*L to 20*d*L, and 20*a*R to 20*d*R) are examples of a load which is supplied with the power generated by the power generation device 40*a*, and are propulsion systems that are supported by the two booms 18 and generate the thrust for causing the aircraft to fly during the take-off and landing, that is, the thrust in the vertical direction. Among the eight VTOL rotors 20, the four VTOL rotors 20*a*L to 20*d*L are supported on the left boom 18 at substantially equal intervals, and the remaining four VTOL rotors 20*a*R to 20*d*R are supported on the right boom 18 at substantially equal intervals. Here, among the VTOL rotors 20*a*L to 20*d*L on a left side, the VTOL rotor 20*a*L is arranged in the front, the two VTOL rotors 20*b*L, 20*c*L are respectively arranged in front and behind between the front wing 14 and the rear wing 16, and the VTOL rotor 20*d*L is arranged at the end. Similarly, among the VTOL rotors 20*a*R to 20*d*R on a right side, the VTOL rotor 20*a*R is arranged in the front, the two VTOL rotors 20*b*R, 20*c*R are respectively arranged in front and behind between the front wing 14 and the rear wing 16, and the VTOL rotor 20*d*R is arranged at the end. Among these VTOL rotors 20*a*L to 20*d*L on the left side and the four VTOL rotors 20*a*R to 20*d*R on the right side, the two left and right VTOL rotors 20*a*L, 20*a*R, the two left and right VTOL rotors 20*b*L, 20*b*R, the two left and right VTOL rotors 20*c*L, 20*c*R, and the two left and right VTOL rotors 20*d*L, 20*d*R that respectively have the same position in relation to the front-back direction, are paired to be controlled to rotate in opposite directions.

It should be noted that each of the eight VTOL rotors 20*a*L to 20*d*L and 20*a*R to 20*d*R is simply referred to as the VTOL rotor 20 unless otherwise specified.

Figure 2:
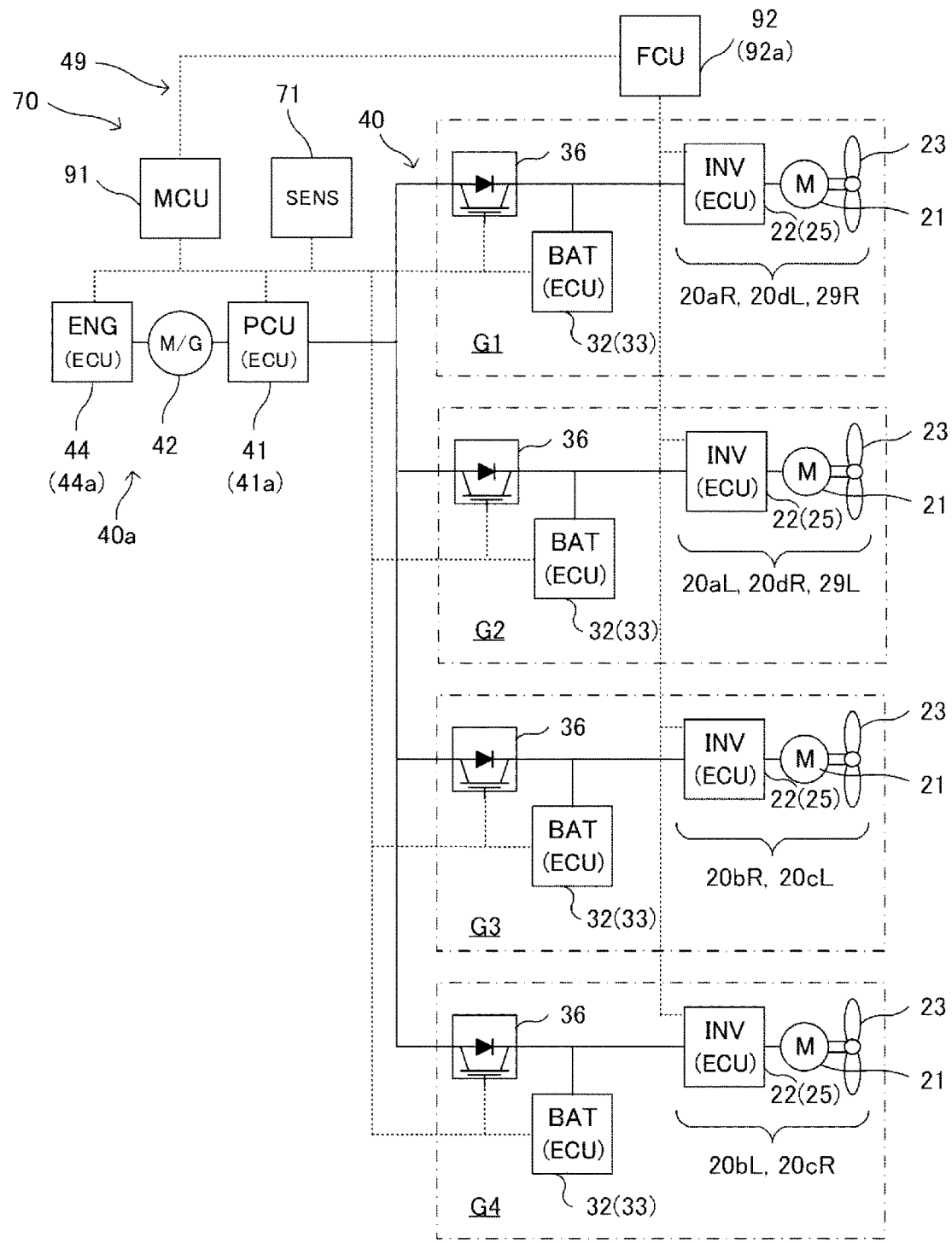
FIG. 2 shows a configuration of a high voltage system and a configuration of a communication system.

The VTOL rotor 20 has one or more blades 23, a motor 21, an inverter 22, and an ECU 25 (refer to FIG. 2).

The one or more blades 23 are members that have a wing shape and are supported on the boom 18 and that rotate to generate the thrust in the vertical direction. In the present embodiment, the number of blades 23 is two, but may be any number including one, or three or more. The one or more blades 23 are supported at a position higher than the front wing 14 and the rear wing 16. It should be noted that in FIG. 1, a plane of rotation of the one or more blades 23 of each VTOL rotor 20 is illustrated by using dash-double dotted lines.

The motor 21 is an electric motor that has a vertically oriented rotation shaft (not shown) to rotate the blade 23 fixed to the motor 21 via a transmission (not shown) that converts a rotational speed of the rotation shaft. The motor 21 is housed in the boom 18.

The inverter 22 is a device that receives DC power supplied from the battery 32 via the high voltage system 40 and drives (turns on and off) switching elements according to a drive signal which is received from the ECU 25, to convert the DC power into AC power and supply the AC power to the motor 21, and is housed in the boom 18 together with the motor 21. The inverter 22 can control a rotational torque and a rate of rotation of the motor 21 respectively by increasing and decreasing an amplitude and a frequency of the AC power.

The ECU (Electronic Control Unit) 25 is a unit that controls an operation of the inverter 22 by transmitting the drive signal to the inverter 22, to modulate the amplitude and the frequency of the AC power and that manages a state of the power which is input to the inverter 22. In the present embodiment, the ECU 25 is provided in the inverter 22. As an example, the ECU 25 is implemented by a microcontroller, is operated by receiving the DC power of a low voltage from the battery 32 via a low voltage system (also referred to as the low voltage system (LVS)), and exhibits a control function by executing a dedicated program stored in a memory. Here, the state of power which is input to the inverter 22 includes at least a voltage applied to an input terminal of the inverter 22 (also referred to as a voltage between terminals), a current entering the input terminal, and a product of those (that is, power). The ECU 25 detects the state of power which is input to the inverter 22 and transmits the detection results to a flight controller 92.

The two cruise rotors 29 (29L, 29R) are examples of a load which is supplied with the power generated by the power generation device 40*a*, and are propulsion systems that are supported at the rear end of the fuselage 12 to generate the thrust for causing the aircraft 100 to fly during the cruise (refer to FIG. 2). The cruise rotors 29L, 29R are: arranged side by side on the right and the left with respect to the central axis L in a duct 28 that has a cylindrical shape and is fixed to the rear end of the fuselage 12; supported in the duct 28; and has one or more blades 23 that generate forward thrust by rotating, the motor 21 that has the rotation shaft oriented in the front-back direction and that rotates the one or more blades 23 fixed to an edge via the rotation shaft, the inverter 22 that receives the DC power supplied from the battery 32 to convert the received the DC power into the AC power and that supplies the AC power to the motor 21, and the ECU 25 that controls the operation of the inverter 22. The inverter 22 can control the rate of rotation of the motor 21. These constituting units are respectively configured to be similar to those in the VTOL rotor 20.

It should be noted that each of the two cruise rotors 29L, 29R is simply referred to as the cruise rotor 29 unless otherwise specified. In addition, the VTOL rotor 20 and the cruise rotor 29 are collectively referred to as the rotors 20, 29 unless otherwise specified.

FIG. 2 shows a configuration of a high voltage system (also referred to as a power distribution unit (PDU) or simply a power unit) 40 and a configuration of a communication system 49.

The high voltage system 40 is an example of the power unit, and is configured to include a set of the power generation devices 40a and four group components G1 to G4. It should be noted that these constituting units are respectively connected via a power line (a power cable indicated by a solid line).

The power generation device 40a is a power source that generates power by using the engine 44 based on a target amount of power generation and that supplies the generated power to the load, and is configured to include the engine (ENG) 44, the motor generator (M/G) 42, and a power control unit (PCU) 41.

The engine 44 is an internal combustion engine such as a reciprocating engine and a gas turbine engine. The engine 44 generates rotational power to output the generated rotational power to the motor generator 42. The engine 44 is controlled by an ECU 44a provided therein.

The ECU 44a is a unit that controls the power generation by operating the engine 44 based on the target amount of power generation which is received from a control unit 91. As an example, the ECU 44a is implemented by the microcontroller, is operated by receiving the DC power of a low voltage from the battery 32 via the low voltage system, and exhibits a control function by executing the dedicated program stored in the memory.

The motor generator 42 is a motor generator that serves as a starter at a time of starting the engine 44 and that also serves as a generator after the engine 44 is started. A rotation shaft of the motor generator 42 is connected to an output shaft of the engine 44. The motor generator 42 receives power from the engine 44 to generate power, that is, the AC power (in particular, three-phase AC power), to output the AC power to the PCU 41, and supplies generated power via the PCU 41 to the load (that is, the VTOL rotor 20 and the cruise rotor 29 for generating the thrust for flight). In addition, when the engine 44 is started, the motor generator 42 receives the AC power to generate the rotational power and output the generated rotational power to the engine 44.

The PCU 41 is a power conversion unit that uses an inverter circuit to convert the AC power (in particular, the three-phase AC power) which is input from a first side, into the DC power to output the DC power to a second side, and converts the DC power which is input from the second side, into the AC power (in particular, the three-phase AC power) to output the AC power to the first side. A first side terminal of the PCU 41 is connected to the motor generator 42, and a second side terminal is connected to each of the four group components G1 to G4. The PCU 41 can convert the AC power which is output from the motor generator 42, into the DC power to output the DC power toward each of the four group components G1 to G4, and convert the DC power which is supplied from the batteries 32 that are included in the four group components G1 to G4, into the AC power to output the AC power to the motor generator 42. The PCU 41 is controlled by an ECU 41a provided therein.

The ECU 41a is a unit that controls the power generation by operating the PCU 41 based on the target amount of power generation which is received from the control unit 91. As an example, the ECU 41a is implemented by the microcontroller, is operated by receiving the DC power of a low voltage from the battery 32 via the low voltage system, and exhibits a control function by executing the dedicated program stored in the memory.

Each of the four group components G1-G4 is a group of electrical components that are assembled to include: any two of the eight VTOL rotors 20, with each of the group components G1 to G2 further including any one of the two cruise rotors 29; and the battery 32 and a switch 36 that are attached to the rotor. It should be noted that these components including the batteries 32 are connected via a circuit element such as the power line (the power cable indicated by the solid line), a conductor, and a diode.

The group component G1 includes the VTOL rotors 20aR, 20dL, the cruise rotor 29R, the battery 32, and the switch 36.

As described above, each of the VTOL rotors 20aR, 20dL, and the cruise rotor 29R has the motor 21 that rotates the one or more blades 23, and the inverter 22 that receives the DC power supplied from the battery 32 to convert the DC power into the AC power and supply the AC power to the motor 21. These three rotors 20, 29 are connected to the battery 32 in parallel. It should be noted that in FIG. 2, for simplicity, the VTOL rotors 20aR, 20dL, and the cruise rotor 29R are represented by one rotor.

The battery 32 is an internal power source that stores the power which is supplied from the power generation device 40a, supplies the stored power to the engine 44 to start the engine 44, and supplies the stored power to the rotors 20, 29 to operate the rotors 20, 29. The battery 32 stores the power which is supplied by the power generation device 40a, and supplies the stored power to the VTOL rotor 20 and the cruise rotor 29 (to the motor 21 via the inverter 22). Here, the state of charge of the battery 32 (in particular, a remaining amount of charge or a charging rate) is also referred to as the SOC (State Of Charge). The battery 32 is connected between the three rotors 20, 29 and the switch 36 described above. The battery 32 is managed by an ECU 33 provided therein.

The ECU 33 is a unit that manages the state of charge (SOC) of the battery 32. As an example, the ECU 33 is implemented by the microcontroller, is operated by receiving the DC power of a low voltage from the battery 32 via the low voltage system, and exhibits a control function by executing the dedicated program stored in the memory. Here, the state of charge of the battery 32 includes at least an amount of charge, an amount of discharge (an amount of power discharge), and a temperature. The ECU 33 detects the state of charge of the battery 32 by any method such as detecting the current which is output from the battery 32 to calculate an integrated amount thereof, or detecting a potential of an output terminal. The detection result is transmitted to the control unit 91 via a communication line.

The switch 36 is an element for connecting and disconnecting the group component G1 to and from the second side terminal of the PCU 41, and as an example, is configured to include a rectifying element (the diode) and a switching element that are connected in parallel. The rectifying element is an element that passes only power directed from the PCU 41 to an inside of the group component G1. The switching element is an element that short-circuits both ends of the rectifying element, and it is possible to use, for example, an element such as an insulated gate bipolar transistor (IGBT). By turning off the switch 36 (the switching element), the DC power which is output from the PCU 41 can be sent to the battery 32 and the three rotors 20, 29 via the rectifying element, and by turning on, the DC power can be sent from the battery 32 to the PCU 41 via the switching element.

It should be noted that by the switch 36 including the rectifying element, the power can be prevented from being supplied, during the operations of the VTOL rotor 20 and the cruise rotor 29, from the battery 32 within a certain group component among the four group components G1 to G4, to another group component.

The group component G2 includes the VTOL rotors 20aL, 20dR, the cruise rotor 29L, the battery 32, and the switch 36. These constituting units are respectively configured to be similar to those in the group component G1. It should be noted that in FIG. 2, for simplicity, the VTOL rotors 20aL, 20dR, and the cruise rotor 29L are represented by one rotor.

The group component G3 includes the VTOL rotors 20bR, 20cL, the battery 32, and the switch 36. These constituting units are respectively configured to be similar to those in the group component G1. In FIG. 2, for simplicity, the VTOL rotors 20bR, 20cL are represented by one rotor.

The group component G4 includes the VTOL rotors 20bL, 20cR, the battery 32, and the switch 36. These constituting units are respectively configured to be similar to those in the group component G1. In FIG. 2, for simplicity, the VTOL rotors 20bL, 20cR are represented by one rotor.

It should be noted that in the aircraft 100 according to the present embodiment, one battery 32 is provided for each of the four group components G1 to G4, which totals four batteries; however, the number of the batteries is not limited to this, and any number of batteries 32 may be provided, for example, one battery 32 is provided for two of the four group components G1 to G4, which totals two batteries, and two batteries 32 are provided for each of the four group components G1 to G4, which totals eight batteries. For the number of group components, the present invention is not limited to assembling a component every three rotors, and assembling the component every two rotors or four rotors may be performed. In addition, each group component may include one or more batteries 32.

A communication system 49 includes the flight controller (FCU) 92, the control unit (MCU) 91, a state sensor 71, the ECU 44a provided in the engine 44, the ECU 41a provided in the PCU 41, and four switches 36 included in the group components G1 to G4, four ECUs 33 that are respectively connected to the batteries 32, and ten ECUs 25 that are respectively connected to the inverter 22. These are connected to be able to communicate with each other via the communication line (a communication cable indicated by a dotted line).

The flight controller 92 is a unit that receives an operation signal from the crew of the aircraft 100 via an interface 92a such as a control stick and a thrust lever, and controls the operation of each of the constituting units. The flight controller 92 is connected to each of the control unit 91 and the ten ECUs 25 via the communication line. As an example, the flight controller 92 is implemented by the microcontroller, is operated by receiving the DC power of a low voltage from the battery 32 via the low voltage system, and exhibits a control function by executing the dedicated program stored in the memory.

For example, when the flight controller 92 receives a command in relation to steering of the aircraft 100, a command to take off or to cruise, or the like, via the interface 92a, the flight controller 92 causes the power generation device 40a to generate the power required to operate the rotors 20, 29 by detecting, by the ECU 25, states (the rotational speed of the blades 23, the voltage between the terminals of the inverter 22, or the like) of the VTOL rotor 20 and the cruise rotor 29 (that is, the loads); determining, based on the states, respectively required thrust (also referred to as a thrust command value) and an amount of power respectively required to generate the thrust (that is, a target amount of power feeding); and transmitting the thrust command value and the target amount of power feeding, to the ECUs 41a and 44a via the control unit 91. Along with this, by transmitting the thrust command value (or the rotational speeds of the rotors 20, 29 required to generate the thrust) to the ECU 25, the switching element of the inverter 22 is operated, and the DC power which is output from the PCU 41 or the DC power which is supplied from the battery 32 is converted into the AC power to be output to the motor 21. In this manner, by the motor 21 being operated, and the blades 23 being rotated, it is possible to generate the thrust which the VTOL rotor 20 and the cruise rotor 29 are commanded to perform.

The control unit (MCU) 91 is a unit that comprehensively controls control units (that is, the ECUs) included in the communication system 49, and for example, communicates with the switch 36 to control the operation of the switching element thereof, transmits the target amount of power generation to the ECUs 44a, 41a to control the power generation by the engine 44 and the PCU 41, that is, the power generation device 40a, and communicates with the ECU 33 to detect the state of the battery 32 (in particular, the state of charge). The control unit 91 is connected to each of the engine 44 (the ECU 44a), the PCU 41 (the ECU 41a), the four switches 36, and the four ECUs 33 via the communication line. As an example, the control unit 91 is implemented by the microcontroller, is operated by receiving the DC power of a low voltage from the battery 32 via the low voltage system, and exhibits a control function by executing the dedicated program stored in the memory.

The state sensor 71 includes a plurality of sensors that detect a flight condition of the aircraft 100. The flight condition includes a state of the airframe such as an altitude, an attitude, a speed, and a position of the aircraft 100 (the airframe), a state of an engine such as a rotational speed of the engine 44, temperatures and pressures of an intake port and an exhaust port, and a state of an environment (in this case, the sky) surrounding the aircraft 100 such as a temperature, an air pressure, and a wind speed. The state sensor 71 includes an altitude sensor, an attitude sensor (a gyro sensor), a speed sensor, and a GPS sensor for detecting the state of the airframe, includes a rotational speed sensor, a temperature sensor, and a pressure sensor for detecting the state of the engine 44, and includes a temperature sensor, an air pressure sensor, and a wind speed sensor for detecting the state of the environment. The detection results by these sensors are transmitted to the control unit 91. It should be noted that the detection result of the sensor that detects the state of the engine 44 is transmitted to the control unit 91 via the ECU 44a.

The ECU 44a, the ECU 41a, the switch 36, the ECU 33, and the ECU 25 are configured as described above.

The control system 70 is a system that controls the power unit that charges the battery 32 by the power generation device 40a, and is configured to include the control unit 91, the state sensor 71, the ECU 44a, ECU 41a, and the four ECU 33, among the control unit and the like included in the communication system 49. In particular, the control unit 91 in the control system 70 is configured to calculate a charging time of the battery 32 based on a required amount of power storage that should be stored in the battery 32 when the aircraft 100 flies in a predetermined flight condition, and the state of the battery 32; and determine a charge start time of the battery based on the charging time and a flight time it takes to reach the predetermined flight condition, to control the power generation by the power generation device 40a. The processing flow will be described below.

Figure 3:
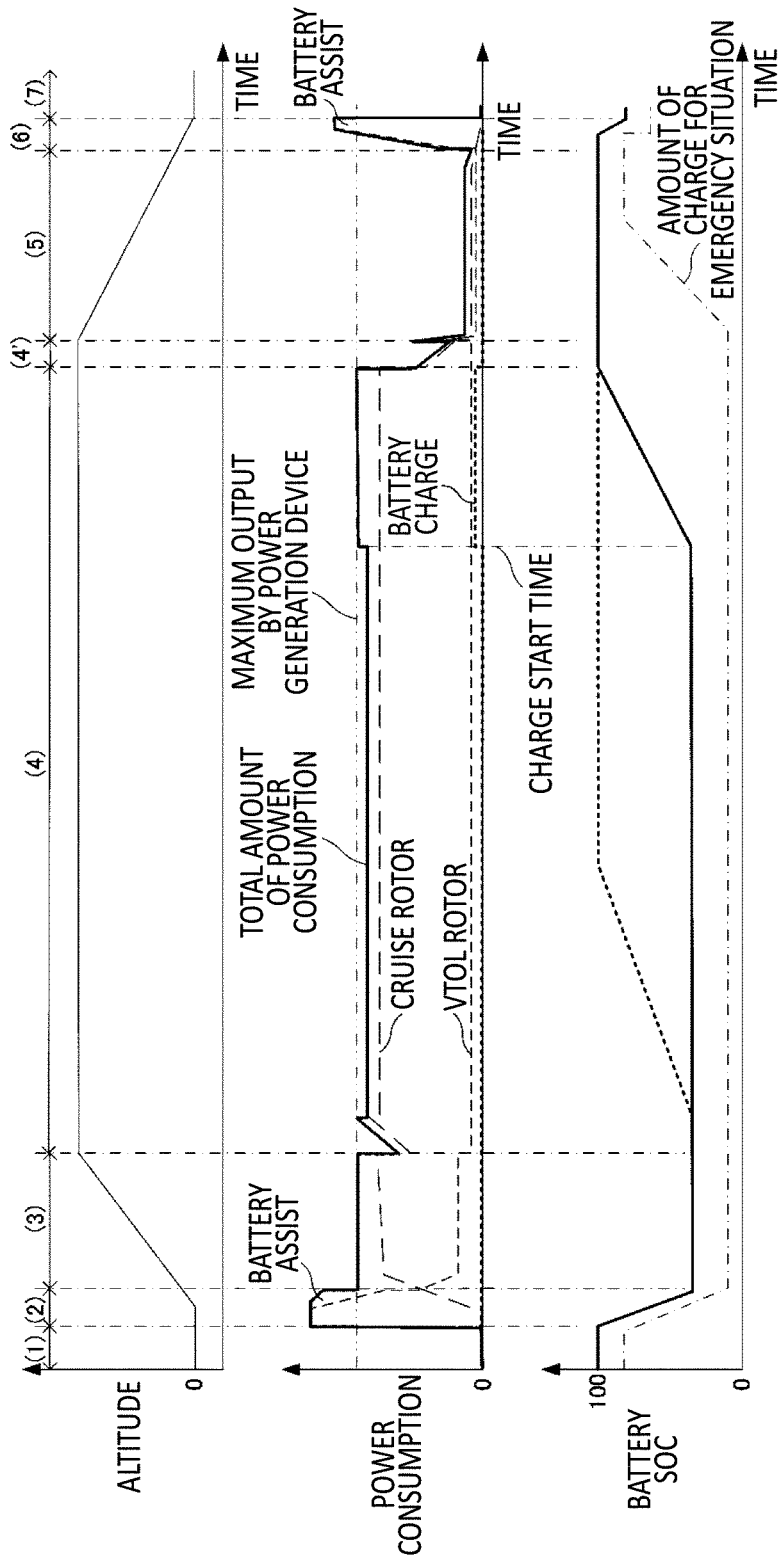
FIG. 3 shows examples of temporal transitions of a flight condition of the aircraft, an amount of power consumption by a rotor, an amount of charging consumption for a battery, a total amount of power consumption, and a state of charge (SOC) of the battery.

An upper part, a middle part, and a lower part of FIG. 3 respectively show examples of temporal transitions of a flight condition of the aircraft 100, an amount of power consumption by the VTOL rotor 20 and the cruise rotor 29, an amount of charging consumption for the battery 32, a total amount of power consumption, and the state of charge (SOC) of the battery 32. It should be noted that an amount of power generation (that is, a power output) of the power generation device 40a is equal to greater one between the total amount of power consumption which changes from moment to moment as shown in the drawing, and a possible amount of power generation (a maximum output) by the power generation device 40a generating the power.

As shown in the upper part, for example, the aircraft 100 (1) travels on wheels on a taxiway of an airport to move to an airfield (referred to as taxiing), (2) operates the VTOL rotor 20 to take off, (3) further operates the cruise rotor 29 to ascend by acceleration, (4) stops the VTOL rotor 20 (minimizes the output in the present example) and operates only the cruise rotor 29 to cruise, (4') reduces the output of the cruise rotor 29 when the destination is reached, (5) descends by deceleration, (6) operates the VTOL rotor 20 to land at an airfield of the destination, and (7) stops the VTOL rotor 20, travels on the wheels on a taxiway, and exits from the airfield.

In the temporal transition of the flight condition described above, as shown in the middle part, the amount of power consumption of the VTOL rotor 20 becomes great, in particular, during (2) the take-off and (6) the landing by operating the VTOL rotor 20. At this time, the amount of power consumption by the VTOL rotor 20 (that is, the target amount of power feeding during the take-off and landing) is greater than the maximum output of the power generation device 40a, and a shortage is compensated for by the discharged power from the battery 32 (this is referred to as battery assist). In this manner, the state of charge (SOC) of the battery 32 decreases, as shown in the lower part. Accordingly, it is not appropriate to charge the battery 32 in these flight conditions.

On the other hand, the amount of power consumption of the cruise rotor 29 becomes great during (3) the ascending by acceleration and (4) the cruise by operating the cruise rotor 29. The amount of power consumption by the cruise rotor 29 at this time is smaller than the maximum output of the power generation device 40a, and thus it is possible to charge the battery 32 by generated surplus power. In particular, during (4) the cruise, the aircraft 100 sufficiently gains the altitude to minimize the output of the VTOL rotor 20, and operates the cruise rotor 29 to fly in the horizontal direction. In comparison to the time of the take-off and landing, the power consumption by the cruise rotor 29 (that is, the target amount of power feeding during the cruise) is smaller, and a fluctuation is normally small, a time in the state of the cruise is longer, and the battery 32 is more stably and appropriately charged.

As shown in the lower part, the state of charge (SOC) of the battery 32 greatly decreases (2) during the take-off by discharging to feed the power to the VTOL rotor 20, and performing the battery assist, (4) reaches a full charge by charging of feeding the power from the power generation device 40a at any timing during the cruise, and (6) decreases again during the landing by discharging to feed the power to the VTOL rotor 20, and performing the battery assist. Accordingly, (6) it is required to charge, during the cruise, (4) the amount of discharge for the battery assist which is required during the landing. At this time, in a case where the battery 32 stores a minimally required remaining amount of charge (an amount of charge for an emergency situation) to avoid the emergency situation, it is possible to perform a charge for the battery assist during the landing, (4) at any timing during the cruise. However, as indicated by the dotted line (4), when the battery 32 is charged at an early timing during the cruise, the battery 32 is in a state of the full charge for a long period of time, and thus the deterioration of the battery 32 easily progresses.

Figure 4:
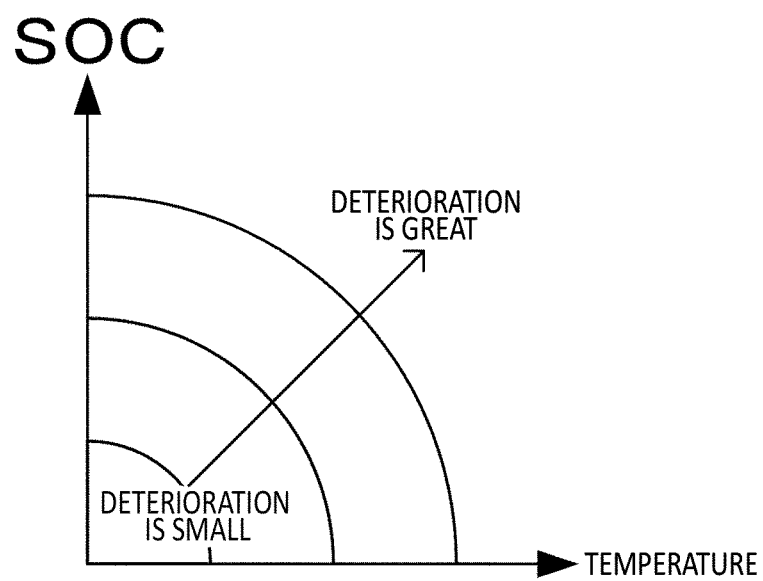
FIG. 4 shows a degree of a progress of a deterioration of the battery with respect to the state of charge and a temperature of the battery.

FIG. 4 shows a degree of a progress of a deterioration of the battery 32 with respect to the state of charge (SOC) and a temperature of the battery 32. As the state of charge (SOC) of the battery 32 is great and as the temperature is high, an internal resistance of the battery 32 is great, and a power loss that occurs during the charge and the discharge is great, and the deterioration easily progresses. Accordingly, as indicated by the solid line in the lower part of FIG. 3, it is appropriate to charge the battery 32 at a late timing during (4) the cruise to maintain the SOC as low as possible.

Figure 5:
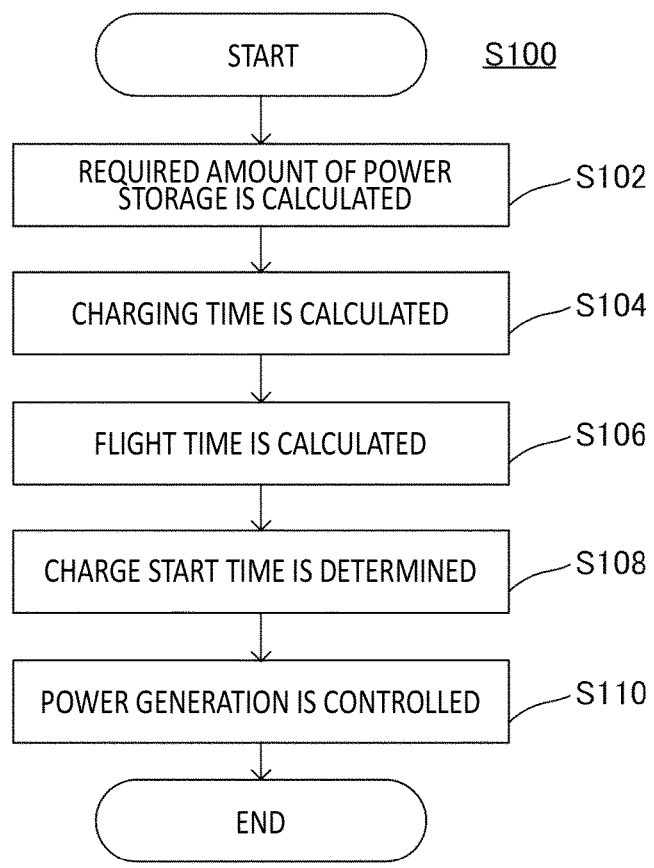
FIG. 5 shows a flow of a control method according to the present embodiment.

FIG. 5 shows a flow S100 of a control method according to the present embodiment. The present flow can be executed by the control unit 91 before a start of the flight or at any timing after a start of the flight, for example, at a regular interval.

In step S102, the control unit 91 determines the required amount of power storage that should be stored in the battery 32 when the aircraft 100 flies in a predetermined flight condition. In the present embodiment, the predetermined flight condition is set to be a state of landing ((6) in FIG. 3) which requires the battery assist by the discharging from the battery 32, and (4) in a state of cruise before this flight condition, the battery 32 is charged. Here, the required amount of power storage can be determined from a sum of a required amount of power feeding (that is, a difference between the target amount of power feeding of the rotors 20, 29 and the maximum output of the power generation device 40a) by which the feeding is required during the landing from the battery 32 to a propulsion system, that is, the VTOL rotor 20 and/or the cruise rotor 29, and an amount of power storage for the emergency situation that is required to be stored to avoid the emergency situation. The required amount of power storage includes not only the required amount of power feeding but also the amount of power storage for the emergency situation, and thus even in a case where the emergency situation occurs, by feeding the power from the battery 32 to operate the VTOL rotor 20 and/or the cruise rotor 29, it is possible to continue the flight and avoid the emergency situation.

The required amount of power feeding can be determined based on a flight plan. The control unit 91 acquires the flight plan by inputting by the crew via the interface 92a before the flight, receiving from (a control tower of) the airport which is a point of departure, or the like; acquires, from the flight plan, an air route to an airport of a destination and weather information of the airport of the destination; and calculate the thrust to be generated by the VTOL rotor 20 during the landing. It should be noted that the weather information may be received from (the control tower of) the airport of the destination. In particular, when the wind speed is high at the destination, a great load is applied to the airframe of the aircraft 100, the thrust to be generated by the VTOL rotor 20 increases to withstand the wind speed and maintain the attitude of the airframe, and the required amount of power feeding increases. Therefore, the control unit 91 determines the required amount of power feeding to be fed to the VTOL rotor 20 during the landing, according to the flight plan, and corrects the required amount of power feeding by multiplying a disturbance coefficient based on the weather information of the destination.

The amount of power storage for the emergency situation can be determined based on the detection result of the state sensor 71. When the emergency situation, such as a failure of a device in the airframe, a device in the power system, or a device in the communication system, occurs during the flight, the thrust to be generated by the VTOL rotor 20 and the cruise rotor 29 increases to maintain the safe flight condition, the power to be fed to the VTOL rotor 20 and the cruise rotor 29 also increases. In addition, when the power generation device 40a fails, the amount of power fed from the power generation device 40a decreases, and thus the amount of power to be fed from the battery 32 to the rotors 20, 29 increases. The amount of increase varies greatly depending on the flight condition. Therefore, the control unit 91 identifies the flight condition ((1) to (7) in FIG. 3) based on the altitude, the speed, the attitude, or the like of the airframe based on the detection result of the state sensor 71; and determines the amount of power storage for the emergency situation according to the identified flight condition, for example, during (2) the take-off, during (6) the landing, and before those (1) (5), the amount of charge is set to be great, and during (3) the ascending by acceleration and during (4) the cruise, the amount of charge is set to be small.

It should be noted that the control unit 91 may save in advance the amount of power storage for the emergency situation as a function or a map according to the altitude, the speed, and the flight condition of the aircraft 100. In addition, the required amount of power storage may be determined in advance for each emergency situation which is assumed according to the altitude, the speed, and the flight condition of the aircraft 100, and among them, based on the required amount of power for the emergency situation corresponding to the altitude, the speed, and the flight condition of the aircraft 100, the required amount of power storage for the emergency situation may be determined. While the lift is generated during (4) the cruise, the lift is not generated during (2) the take-off, (3) the ascending by acceleration, (5) the descending by deceleration, and (6) the landing, and thus the required amount of power storage to generate the thrust by the rotor 20 tends to be great. More specifically, for example, during a low speed flight and a low altitude flight during (2) the take-off or the like, it is required to set the amount of power storage for the emergency situation to be particularly great to compensate for the failure of the power generation device 40a; during (4) the cruise, the flight condition is that the cruise rotor 29 is operated, and thus the power which is required is comparatively small, and the amount of power storage for the emergency situation can be set to be small; and (6) during the landing, the flight condition is that the VTOL rotor 20 is operated, and thus the power which is required is comparatively great, and the amount of power storage for the emergency situation is required to be great.

In step S104, the control unit 91 calculates the charging time based on the state of charge of the battery 32. Here, the state of charge of the battery 32, in particular, the state of charge and the temperature of the battery 32 are detected by the ECU 33. The control unit 91 calculates the charging time based on the detection result.

Figure 6:
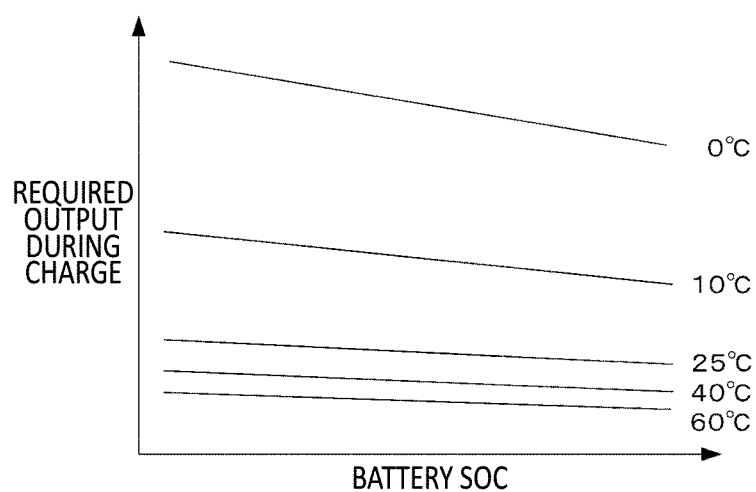
FIG. 6 shows a relationship between the state of charge (SOC) and the temperature of the battery, and a required output during a charge.

FIG. 6 shows a relationship between the state of charge (SOC) and the temperature of the battery 32, and a required output during a charge. The required output during the charge is an output power of the power generation device 40a which is required to charge the battery 32 by a unit amount of power, and as the state of charge of the battery 32 is low and as the temperature is low, the internal resistance of the battery 32 is great, and the loss is great, and thus the required output during the charge is great. Therefore, in order to reduce the loss and suppress the deterioration of the battery 32, a charging speed may be controlled such that the charging speed is slowed down for a state of the battery in which the required output during the charge is great and the charging speed is increased for a state of the battery state in which the required output during the charge is small.

It should be noted that charging power with which the battery 32 is to be charged may be determined from the battery SOC, and charging speed may be determined from the battery temperature, on assumption that the required output during the charge is substantially constant with respect to the battery SOC.

The control unit 91 determines the charging power with which the battery 32 is to be charged based on the required amount of power storage determined in step S102 and the detection result of the state of charge of the battery 32; determines the charging speed based on the state of charge and the temperature of the battery 32; and calculates the charging time which is required to charge the battery 32 based on the determined charging power and charging speed. By determining the charging power and the charging speed of the battery 32 based on the required amount of power storage and the state of the battery 32 in this way, it is possible to suppress the load which is applied to the battery 32 by charging the charging power at the charging speed in accordance with the state of the battery 32.

In step S106, the control unit 91 calculates the flight time based on the detection result of the state sensor 71. The control unit 91 detects, in particular, the speed and the position of the aircraft 100 by using the state sensor 71; calculates a remaining flight distance to the destination based on the detection result of the position; and calculates, based on the remaining flight distance and the speed, a predetermined flight condition, that is, the flight time it takes to reach the destination and enter the state of landing.

In step S108, the control unit 91 determines the charge start time of the battery 32 based on the charging time calculated in step S104 and the flight time calculated in step S106.

In step S110, the control unit 91 controls the operation of the power generation device 40a based on the charge start time determined in step S108 and the charging power of the battery 32. As shown in FIG. 3, when the charge start time comes, the control unit 91 distributes the power generated by the power generation device 40a to the battery 32, over the charging time, at the charging speed determined in step S104, to charge the battery 32 with the required charging power. At this time, the target amount of power generation of the power generation device 40a is given by a sum of the target amount of power feeding during the cruise to feed the power to the rotors 20, 29, and the charging power with which the battery 32 is required to be charged. The control unit 91 transmits the target amount of power generation to the ECUs 44a, 41a to control the power generation by the engine 44 and the PCU 41, that is, the power generation device 40a. This makes it possible to suppress a fuel consumption by the power generation device 40a generating, until the charge start time, only the power required for the aircraft 100 to fly.

Before the aircraft 100 enters the state of landing, and in the present example, before further entering a state of descending by deceleration, the charging up to the required amount of power storage of the battery 32 is completed. In this manner, the flow ends.

The control system 70 according to the present embodiment includes: the VTOL rotor 20 and the cruise rotor 29 configured to generate the thrust for causing the aircraft 100 to fly; the power unit that has the power generation device 40a configured to generate power and supply the power to the rotors 20, 29, and the battery 32 configured to store the power which is supplied from the power generation device 40a, and supply the stored power to the rotors 20, 29; and the control unit 91 configured to calculate the charging time of the battery 32 based on the required amount of power storage that should be stored in the battery 32 when the aircraft 100 flies in a predetermined flight condition, and the state of the battery 32, and determine the charge start time of the battery 32 based on the charging time and the flight time it takes to reach the predetermined flight condition. By calculating the charging time of the battery 32 based on the required amount of power storage that should be stored in the battery 32 when the aircraft 100 flies in the predetermined flight condition, and the state of the battery 32, and by determining the charge start time of the battery 32 based on the charging time and the flight time it takes to reach the predetermined flight condition, it is possible to store the required amount of power storage in the battery 32 until the predetermined flight condition is reached after the charging of the battery 32 is started at the charge start time, and it is possible to suppress the deterioration of the battery 32 by maintaining the amount of charge of the battery 32 to be low until the charge start time.

The aircraft 100 according to the present embodiment includes the control system 70. With the control system 70, it is possible to suppress the deterioration of the battery 32.

A control method according to the present embodiment is a method that controls the power unit configured to generate the power, by the power generation device 40a, to supply the power to the VTOL rotor 20 and the cruise rotor 29 configured to generate the thrust for causing the aircraft 100 to fly, and store, by the battery 32, the power which is supplied from the power generation device 40a, and supply the stored power to the rotors 20, 29, the control method including: calculating the charging time of the battery 32 based on the required amount of power storage that should be stored in the battery 32 when the aircraft 100 flies in a predetermined flight condition, and the state of the battery 32; and determining the charge start time of the battery 32 based on the charging time and the flight time it takes to reach the predetermined flight condition. By calculating the charging time of the battery 32 based on the required amount of power storage that should be stored in the battery 32 when the aircraft 100 flies in the predetermined flight condition, and the state of the battery 32, and by determining the charge start time of the battery 32 based on the charging time and the flight time it takes to reach the predetermined flight condition, it is possible to store the required amount of power storage in the battery 32 until the predetermined flight condition is reached after the charging of the battery 32 is started at the charge start time, and it is possible to suppress the deterioration of the battery 32 by maintaining the amount of charge of the battery 32 to be low until the charge start time.

While the present invention has been described with the embodiments, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A control system that is configured to control a power unit configured to charge a battery by a power generation device, the control system comprising:
    a propulsion system configured to generate a thrust for causing an aircraft to fly;
    a power unit that has
        a power generation device configured to generate power and supply the power to the propulsion system, and
        a battery configured to store power which is supplied from the power generation device, and supply stored power to the propulsion system; and
    a control unit configured to
        calculate a charging time of the battery based on a required amount of power storage that should be stored in the battery when the aircraft flies in a predetermined flight condition, and a state of the battery, and
        determine a charge start time of the battery based on the charging time and a flight time it takes to reach the predetermined flight condition, wherein
    the state of the battery is a remaining amount of power and a temperature of the battery, and
    the control unit is configured to
        determine charging power and a charging speed of the battery based on the required amount of power storage and the state of the battery, and
        determine the charging time based on the charging power and the charging speed.

2. The control system according to claim 1, wherein the control unit is configured to control an operation of the power generation device based on the charge start time and the charging power of the battery.

3. The control system according to claim 2, wherein the control unit is configured to determine the required amount of power storage from a sum of a required amount of power feeding which is required to be fed to the propulsion system when the aircraft flies in the predetermined flight condition, and an amount of power storage for an emergency situation which is required to be stored to avoid the emergency situation.

4. The control system according to claim 2, further comprising a sensor configured to detect the flight condition of the aircraft, wherein
    the control unit is configured to calculate the flight time based on a detection result of the sensor.

5. The control system according to claim 1, wherein the control unit is configured to determine the required amount of power storage from a sum of a required amount of power feeding which is required to be fed to the propulsion system when the aircraft flies in the predetermined flight condition, and an amount of power storage for an emergency situation which is required to be stored to avoid the emergency situation.

6. The control system according to claim 1, further comprising a sensor configured to detect the flight condition of the aircraft, wherein
the control unit is configured to calculate the flight time based on a detection result of the sensor.

7. The control system according to claim 1, wherein the predetermined flight condition is a state of landing.

8. An aircraft comprising the control system according to claim 1.

9. A control system that is configured to control a power unit configured to charge a battery by a power generation device, the control system comprising:
a propulsion system configured to generate a thrust for causing an aircraft to fly;
a power unit that has
a power generation device configured to generate power and supply the power to the propulsion system, and
a battery configured to store power which is supplied from the power generation device, and supply stored power to the propulsion system; and
a control unit configured to
calculate a charging time of the battery based on a required amount of power storage that should be stored in the battery when the aircraft flies in a predetermined flight condition, and a state of the battery, and
determine a charge start time of the battery based on the charging time and a flight time it takes to reach the predetermined flight condition, wherein
the control unit is configured to determine the required amount of power storage from a sum of a required amount of power feeding which is required to be fed to the propulsion system when the aircraft flies in the predetermined flight condition, and an amount of power storage for an emergency situation which is required to be stored to avoid the emergency situation.

10. The control system according to claim 9, wherein
the control unit is configured to determine the required amount of power feeding based on a flight plan.

11. The control system according to claim 10, further comprising a sensor configured to detect a flight condition of the aircraft, wherein
the control unit is configured to determine the amount of power storage for the emergency situation based on a detection result of the sensor.

12. The control system according to claim 10, further comprising a sensor configured to detect the flight condition of the aircraft, wherein
the control unit is configured to calculate the flight time based on a detection result of the sensor.

13. The control system according to claim 9, further comprising a sensor configured to detect a flight condition of the aircraft, wherein
the control unit is configured to determine the amount of power storage for the emergency situation based on a detection result of the sensor.

14. The control system according to claim 13, further comprising a sensor configured to detect the flight condition of the aircraft, wherein
the control unit is configured to calculate the flight time based on a detection result of the sensor.

15. The control system according to claim 9, further comprising a sensor configured to detect the flight condition of the aircraft, wherein
the control unit is configured to calculate the flight time based on a detection result of the sensor.

16. The control system according to claim 9, further comprising a sensor configured to detect the flight condition of the aircraft, wherein
the control unit is configured to calculate the flight time based on a detection result of the sensor.

17. The control system according to claim 9, wherein the predetermined flight condition is a state of landing.

18. An aircraft comprising the control system according to claim 9.

19. A control method that controls a power unit configured to
generate power, by a power generation device, to supply the power to a propulsion system configured to generate a thrust for causing an aircraft to fly, and
store, by a battery, power which is supplied from the power generation device, and supply stored power to the propulsion system, the control method comprising:
calculating a charging time of the battery based on a required amount of power storage that should be stored in the battery when the aircraft flies in a predetermined flight condition, and a state of the battery;
determining a charge start time of the battery based on the charging time and a flight time it takes to reach the predetermined flight condition;
determining charging power and a charging speed of the battery based on the required amount of power storage and the state of the battery; and
determining the charging time based on the charging power and the charging speed, wherein
the state of the battery is a remaining amount of power and a temperature of the battery.

20. A control method that controls a power unit configured to
generate power, by a power generation device, to supply the power to a propulsion system configured to generate a thrust for causing an aircraft to fly, and
store, by a battery, power which is supplied from the power generation device, and supply stored power to the propulsion system, the control method comprising:
calculating a charging time of the battery based on a required amount of power storage that should be stored in the battery when the aircraft flies in a predetermined flight condition, and a state of the battery;
determining a charge start time of the battery based on the charging time and a flight time it takes to reach the predetermined flight condition; and
determining the required amount of power storage from a sum of a required amount of power feeding which is required to be fed to the propulsion system when the aircraft flies in the predetermined flight condition, and an amount of power storage for an emergency situation which is required to be stored to avoid the emergency situation.

* * * * *